United States Patent Office 2,767,962
Patented Oct. 23, 1956

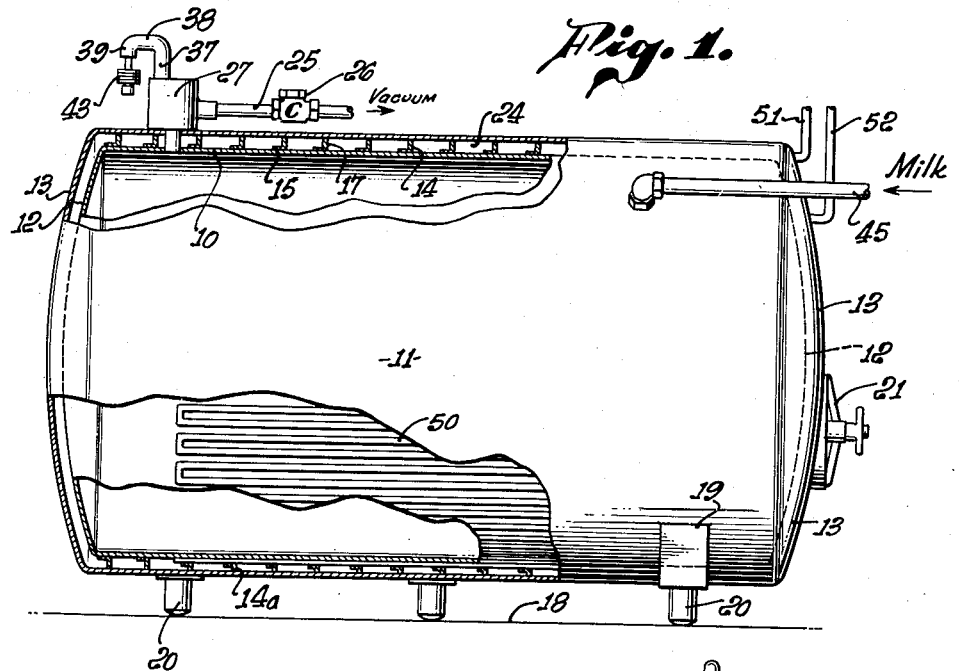
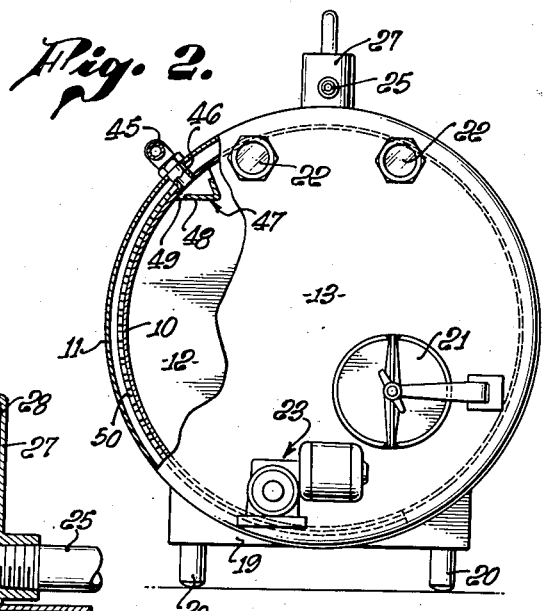
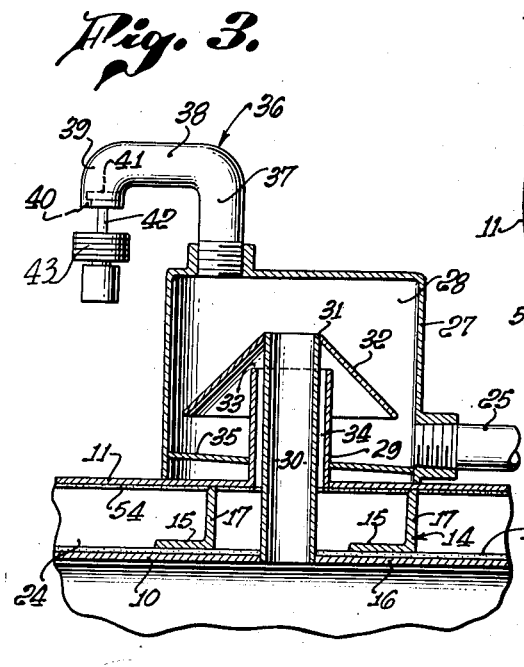

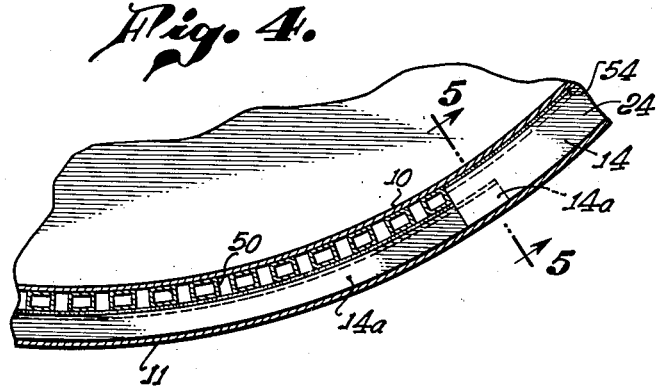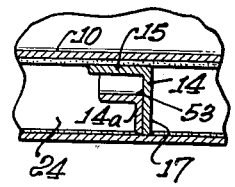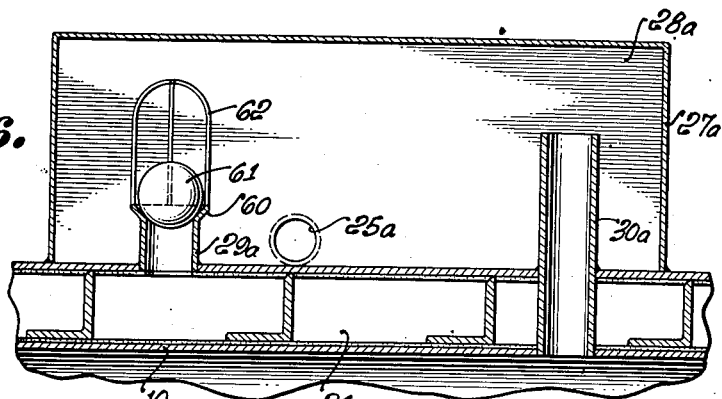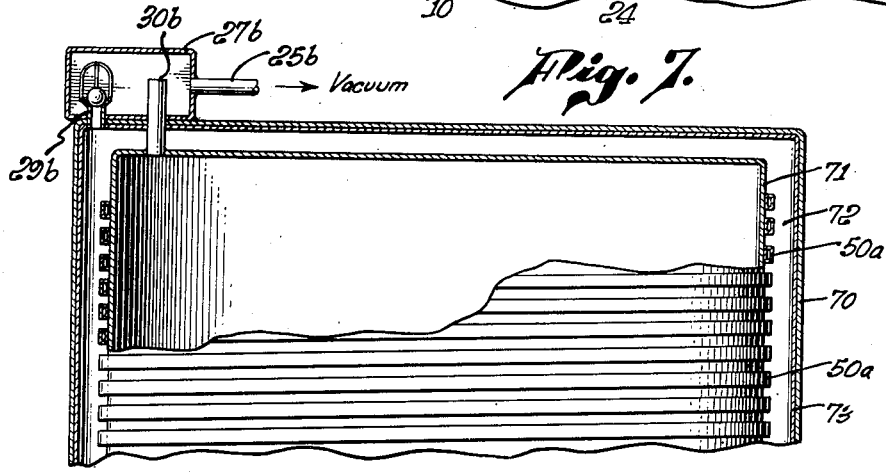
Louis A. Blackburn,
INVENTOR.

2,767,962

VACUUM MILK TANK

Louis A. Blackburn, Huntington Park, Calif.

Application October 10, 1952, Serial No. 314,150

8 Claims. (Cl. 257—211)

The present invention relates to milk storage tanks, and more particularly to tanks for holding milk under partial vacuum conditions.

In many areas, milk is drawn from the cows into a receiving tank under partial vacuum conditions, the milk being stored in the tank under such conditions. In the interests of health and sanitation, the inner surfaces of the tank must be made of a material that is non-reactive with the milk and which is non-corrosive. One such material used heretofore has been stainless steel, although other suitable materials may be substituted in its place. Regardless of the particular material employed, the provision of a partial vacuum in the tank, which may be of a substantial value, has required that the material thickness be comparatively great to withstand the atmospheric pressure tending to buckle or collapse the tank, which makes the cost of the stainless steel (or equivalent) tank exorbitant.

Accordingly, it is an object of the present invention to provide a milk tank embodying a non-corrosive shell of comparatively thin or light material, which does not tend to collapse despite the presence of substantial negative or sub-atmospheric pressure in the shell.

Another object of the invention is to provide a milk tank including a non-corrosive shell that can be subjected to comparatively high vacuum conditions without danger of buckling the shell, by causing a substantially balanced sub-atmospheric pressure condition to exist internally and externally of the shell. Under some conditions, the partial vacuum internally of the shell cannot exceed the partial vacuum externally of the shell, so that there are no inwardly directed atmospheric forces tending to collapse the shell.

A further object of the invention is to provide a milk tank embodying an outer shell containing an inner milk receiving shell spaced inwardly from the outer shell to provide an annular space therebetween, both the interior of the inner shell and the annular space being subjected to a partial vacuum to substantially balance the pressure internally and externally of the inner shell, and to insulate the inner shell against transfer of heat to its contents from the exterior of the tank.

Yet another object of the invention is to provide a milk tank embodying an inner milk receiving shell which is held in spaced relation to an enclosing outer shell, in which the inner shell is reinforced by a structure that does not interfere with refrigeration tubing disposed at least partially around the inner shell and in contact therewith. The reinforcing structure does not interfere with the subjecting of the interior of the inner shell and the space between the inner and outer shell to negative pressures.

In its general aspects, the invention contemplates the provision of a stainless steel, or equivalent, inner shell that may be comparatively light and of thin-gauge material. This shell can be maintained under vacuum conditions, which, for example, might be about seventeen inches of mercury below atmospheric pressure. Normally, if such vacuum were imposed on the interior of a thin shell, the atmospheric pressure externally thereof would collapse the shell inwardly. As a result, attempts at using vacuum inside a stainless steel, or equivalent, tank has necessitated the making of the tank of relatively thick material, which is exceedingly costly. The thickness of the material is normally necessitated by the desire to maintain the interior of the tank flush, to facilitate its maintenance in a clean and sanitary condition. In the present instance, the desirable results of using stainless, or similar, non-corrosive metals, and of also imposing a negative pressure condition in the tank, are achieved by enclosing the stainless steel shell, which is to receive the milk, in an outer shell, held in spaced relation with respect to the inner shell. Since the outer shell does not come in contact with the milk at all, it can be made of a much cheaper steel, or other material, than the stainless steel from which the tank is fabricated. The outer shell is held in spaced relation from the inner shell, and both shells may reinforce one another, by the provision of intervening reinforcing bands, the space or jacket between the inner and outer shells being also subjected to a sub-atmospheric or vacuum condition. As a matter of fact, if desired, the same vacuum that is provided in the inner shell may also be provided in the annular jacket or space between the inner and outer shells.

In view of the provision of substantially the same pressure externally of the inner shell as is provided internally of the inner shell, there are no atmospheric pressures tending to buckle or collapse the inner shell. This permits the inner shell to be made of comparatively thin material. The jacket space between the inner and outer shells is also subjected to a partial vacuum condition, but the outer shell can be made sufficiently thick in an economical manner, since the material from which the outer shell is made can be considerably cheaper than the stainless steel, or equivalent material, from which the inner shell is made. As a result, the entire tank structure can be maintained under vacuum conditions with a suitable non-corrosive inner shell, with the cost of the tank kept at a reasonable amount.

The provision of the partial vacuum both within the inner shell and in the jacket space between the inner and outer shells not only balances the pressure across the inner shell, but it also provides insulation between the inner and outer shells. The fact that the air is at a substantially lower pressure in the jacket, and the further fact that the air in this space is dead air, means that insulation of a high order is provided. As a result, the tank can be refrigerated and maintained under refrigeration condition, to cool and hold the milk in a cool condition, without any substantial amount of heat transfer to the contents of the milk tank.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Figure 1 is a longitudinal view, with parts being shown in elevation and parts in section, of a horizontal type of milk tank embodying the invention;

Fig. 2 is an end elevation of the milk tank disclosed in Fig. 1, as seen from the right thereof, parts being broken away to show certain internal features;

Fig. 3 is an enlarged section through a portion of the tank and the device for evacuating the interior of the inner shell and the jacket space between the inner and outer shells;

Fig. 4 is an enlarged fragmentary section, disclosing the arrangement of the refrigeration coils or tubing and the reinforcing bands between the inner and outer shells;

Fig. 5 is an enlarged cross-section taken along the line 5—5 on Fig. 4;

Fig. 6 is a view similar to Fig. 3, disclosing another embodiment of the device for evacuating the interior of the inner shell and the annular space between the inner and outer shells;

Fig. 7 is a partial vertical section, with parts being disclosed in elevation, of another embodiment of the invention.

As disclosed in the drawings, an inner shell 10 is provided for receiving milk, the inner shell preferably being subjected to a vacuum. This inner shell is disposed within an outer shell 11, being spaced therefrom throughout its length and also having its inner head portions 12 spaced from the outer head portions 13 of the outer shell. The spaced relationship is maintained by suitable reinforcement disposed at spaced intervals around the inner shell 10. As shown, the reinforcement may consist of angle irons 14, 14a that are curved to fit the shells, the foot portion 15 of each angle iron bearing upon insulating paper 16 surrounding the exterior of the inner shell 10, with the leg portions 17 of each angle iron bearing upon the interior of the outer shell 11. The outer shell 11 may be suitably supported on the floor or ground 18 by a plurality of brackets or saddles 19 secured to legs 20 bearing upon the ground or floor.

As illustrated in Figs. 1 and 2, a suitable inspection or access door 21 may be provided in the front wall 13 of the tank, hinged to the outer shell. Also disclosed are glass inspection openings 22 for observing the contents of the tank, and a device 23 for stirring or agitating the milk contained within the tank. These last-mentioned features, however, do not form any part of the present invention.

A partial vacuum may be provided and maintained in the interior of the inner tank 10 and also in the space 24 between the inner and outer shells 10, 11. As disclosed in Figs. 1 to 3, inclusive, a suitable vacuum pump, or source of vacuum (not shown), can draw the air within the inner shell 10 and the annulus 24 around the inner shell through a suitable vacuum line 25 that may have a control valve 26 therein. This vacuum line is threaded into the housing 27 of a vacuum chamber 28 welded or otherwise suitably secured to the exterior of the outer shell 13. This chamber 28 has an outer air inlet pipe 29 extending upwardly thereinto, which communicates with the jacket space 24 between the inner and outer shells 10, 11 and also an inner air vacuum inlet pipe 30 that extends through the jacket space 24 and communicates with the interior of the inner shell 10. The upper end 31 of the inner pipe 30 has a generally conical deflector plate 32 mounted thereon which extends downwardly and outwardly and partially surrounds the upper end 33 of the outer air inlet pipe 29, so that any moisture that may be drawn through the inner pipe 30 is prevented from flowing down through the annular space 34 between the inner and outer pipes 29, 30 and into the jacket space 24 between the inner and outer shells 10, 11. Such moisture can collect upon a moisture plate 35 forming the bottom of the housing 27, and which is tapered slightly toward the vacuum line 25, in order that all of the moisture can be drawn through the vacuum line and away from the apparatus.

A safety vacuum relief device 36 may be placed in communication with the vacuum chamber 28 provided by the housing 27, to prevent the drawing of too high a vacuum in the interior of the inner shell 10 and also in the annular jacket space 24 therearound. This safety device is disclosed as including a tubular member 37 threaded into the upper portion of the housing 27, this tubular member having an arm 38 terminating in a downwardly projecting portion 39 having a valve seat 40 therewithin. This valve seat is engaged by a valve head 41 secured to a stem 42 extending downwardly from the tubular member. Suitable weights 43 may be carried on the stem 42 to urge the head 41 into engagement with its seat 40. In the event that the vacuum in the chamber exceeds a value corresponding to the weight of the valve head 41, its stem 42 and the weights 43, the head 41 will be raised off its seat 40 to allow air to enter the vacuum chamber. In this way, an inordinately high vacuum is prevented from being pulled in the chamber 28, the jacket 24 and the interior of the inner shell 10.

The milk can be drawn into the inner shell 10 by reason of the vacuum provided therein, the milk entering through the milk inlet line 45 which communicates with an inlet pipe 46 extending across the jacket space 24 and opening into the interior of the inner shell 10. The milk from the inlet pipe 46 discharges into a generally acute angle shaped milk trough or distributor 47 extending horizontally along the tank, so that the milk engages the lower portion 48 of the trough and is distributed along the length of the tank. The milk flows over the outer edge 49 of the distributor, which is spaced from the inner wall of the inner shell 10, and down along the inner wall, where the milk is cooled or refrigerated. The refrigeration effect is supplied by a plurality of refrigeration coils or tubes 50, preferably of rectangular cross-section, which engage the outer surface of the inner shell 10, with which the coils are in intimate contact, to obtain good heat transfer from the milk in the tank, through the stainless steel liner shell 10 to the refrigeration coils 50. The refrigerant may be circulated through the refrigeration coils 50 by passing thereto through a suitable inlet line 51 and flowing out of the coils through a suitable outlet line 52. As the milk flows downwardly along the inner surface of the inner shell 10 which is engaged by the refrigeration coils 50, it is cooled to the desired storage temperature.

As disclosed, the refrigeration coils 50 extend only partially around the circumference of the inner shell 10. Inasmuch as it is desired to have a uniform surface on the interior of the inner tank 10, and it is also desired to employ the reinforcing bands 14, 14a between the inner and outer shells 10, 11, the portion 14a of the reinforcing bands disposed around the refrigeration coils 50 are of less radial extent than the portions 14 of the bands extending around the remainder of the inner shell. This arrangement is disclosed most clearly in Fig. 4, in which each reinforcing band is made of two parts, the part 14 of greater radial extent extending substantially from the inner shell 10 to the outer shell 11, and the part 14a of lesser radial extent extending from the outer surfaces of the refrigeration tubing 50 to the outer shell 11, the two band portions 14, 14a overlapping each other and being integrated to each other, as by use of welding material 53, to form a functionally integral single band. There are, of course, a plurality of these bands 14, 14a spaced longitudinally from each other along the length of the tank, as disclosed in Fig. 1. With this arrangement, it is evident that the inner surface of the inner shell 10 is flush and makes no abrupt changes that might preclude proper maintenance of the tank in a sanitary condition.

The vacuum provided in the jacket space 24 not only serves to balance the pressure internally and externally of the inner shell 10, but it also functions as an insulator tending to prevent heat from being transferred from the exterior of the tank to the interior of the inner shell, to warm the milk contents. The amount of heat transfer between the exterior and interior of the tank may be further minimized by preventing metal-to-metal contact between the reinforcing bands 14, 14a and the inner shell, so that no heat is conducted between the inner and outer shells. As disclosed most clearly in Fig. 3, such metal-to-metal contact is precluded by wrapping the exterior of the inner shell with suitable insulating paper 16, which will also be disposed over the exterior of the refrigeration tubing 50. The reinforcing bands 14, 14a contact the paper. Not only does the insulating paper, or other suitable material or coating, prevent the metal-to-metal contact, but it also precludes transfer of radiant heat between the outer and inner shells 11, 10. Such transfer of radiant heat can be further reduced by providing a suitable insulated coating 54 on the interior of the outer shell 11.

In the vacuum device disclosed in Fig. 3, the same vacuum is maintained within the inner shell 10 as is provided in the jacket space 24 between the inner and outer shells 10, 11. This vacuum may be maintained by closing the valve 26, which would provide for the insulating effect of the air under reduced pressure around the exterior of the inner shell 10, even after the application of vacuum is discontinued. The negative pressure within the interior of the inner shell 10 and the space 24 therearound is always equal, the provision of atmospheric pressure in either of these spaces correspondingly providing the same pressure in the other space.

In the form of device disclosed in Fig. 6, provision is made for maintaining the vacuum in the space 24 between the inner and outer shells 10, 11 despite disruption of the vacuum condition in the inner shell 10. Thus, a housing 27a is welded, or otherwise suitably secured, to the top portion of the outer shell 11, the vacuum exhaust line 25a communicating with the chamber 28a provided by this housing. A vacuum inlet pipe 30a communicates with the interior of the inner shell 10, extending through the jacket space 24 into the housing 27a. A vacuum exhaust line 29a extends upwardly from the outer shell 11, communicating with the space 24 between the inner and outer shells 10, 11, and opening upwardly into the interior of the vacuum housing 27a. The upper portion of this pipe 29a is formed as a tapered seat 60 adapted to be engaged by a ball check valve 61, the check valve being maintained in operative position by a suitable wire or cage 62 attached to the upper end of the pipe 29a, the valve 61 being movable downwardly into engagement with the seat 60.

When the vacuum is imposed on the vacuum line 25a and in the housing chamber 28a, it will elevate the ball check valve 61 from its seat 60 and draw air from the jacket space 24. At the same time, the air will be withdrawn through the exhaust line 30a leading to the interior of the inner shell 10. A vacuum to the desired extent may be pulled in this manner, both within the inner shell 10 and the jacket space 24 between the inner and outer shells. In the event that the application of vacuum is discontinued, then the ball check valve 61 can drop down into engagement with its seat 60. When so engaged, air is prevented from flowing from the chamber 28a into the jacket space 24. Accordingly, if the extent of vacuum is decreased, or if air under atmospheric pressure is then allowed to enter the interior of the inner shell 10, such atmospheric pressure condition will not exist in the space 24 between the inner and outer shells, since the check valve 61 is in engagement with the seat 60 and will prevent air from passing into the jacket space. Accordingly, the jacket space will be maintained under a negative pressure, providing an insulated space and minimizing the heat that can be transferred from the exterior of the tank to the interior of the inner shell 10.

In the form of invention disclosed in Fig. 7, a vertical tank is shown embodying the essential features of the invention. In this form, an outer shell 70 is provided, containing an inner shell 71 spaced therefrom to form an insulating space 72, the inner and outer shells being out of metal-to-metal contact with one another. The reinforcing bands of the other embodiment of the invention are not needed in the tank shown in Fig. 7, since the refrigeration tubing 50a itself serves to support and strengthen the inner shell 10, which may be made of relatively light gauge stainless steel, or similar non-corrosive material. The refrigeration coil 50a, which is preferably of rectangular section, is disposed in helical fashion around the exterior of the inner shell 10, and is in spaced relation to the outer shell 70. The outer shell may have a suitable coating 73 of insulating material on its inner wall, to minimize the effects of radiant heat transfer between the outer shell 70 and tubing 50a, and also between the outer shell 70 and the inner shell 71. The inner shell 71 may rest on the bottom of the outer shell 70 or a suitable support (not shown) bearing on the bottom of the outer shell 70, the insulating material 73 preferably being interposed between the inner shell and outer shell to avoid direct conducting of heat therebetween.

A similar arrangement to the one disclosed in Fig. 6 is illustrated in Fig. 7 for providing a vacuum in the interior of the inner shell 71 and also in the jacket space 72 between the inner and outer shells. As shown, an air exhaust line 30b extends from the top of the vertical inner shell 71, across the jacket space 72 and into the housing 27b of the vacuum device. The check valve controlled air exhaust line 29b communicates with the jacket space 72, air evacuated through the vacuum line being drawn from both the interior of the inner shell 71 and the jacket space 72 between the shells 71, 70.

It is, accordingly, apparent that milk tank constructions have been provided which are relatively economical to produce, since the inner shell of stainless steel can be made of relatively thin and lightweight material. The vacuum imposed on the interior of the inner shell does not cause the shell to collapse, since essentially the same vacuum is also imposed in the jacket space around the exterior of the inner shell. The outer shell can be made of the necessary thickness to withstand the collapsing tendency of the atmospheric pressure, but the cost of this outer shell is not prohibitive, since it can be made from a much cheaper steel, or other material, than the stainless steel of which the inner shell is made. Thus, by balancing the pressure internally and externally of the inner shell, an economical vacuum milk receiving and storage tank is provided. In addition, the vacuum around the inner shell serves to insulate it, and enables its contents to be maintained at the desired reduced temperatures.

The inventor claims:

1. In vacuum tank apparatus for receiving milk: an outer shell; an inner shell of non-corrosive material within said outer shell and spaced inwardly from said outer shell substantially completely around said inner shell to avoid contact with said outer shell and to provide a jacket space between said inner and outer shells; a vacuum chamber; a vacuum line communicating with said chamber; a first pipe extending through said jacket space and opening into the interior of said inner shell and into said chamber; a second pipe surrounding and spaced from said first pipe and opening into the interior of said jacket space and into said chamber; and deflector means extending from said first pipe and projecting below the upper end of said second pipe and laterally outward beyond said second pipe whereby moisture from said first pipe is prevented from entering said second pipe.

2. In vacuum tank apparatus for receiving milk: an outer shell; an inner shell of non-corrosive material within said outer shell and spaced inwardly from said outer shell substantially completely around said inner shell to avoid contact with said outer shell and to provide a jacket space between said inner and outer shells containing air throughout its length; refrigeration conducting means in said jacket space in contact with the air therein and contacting the exterior of said inner shell to cool milk in said inner shell and spaced from the inner surface of said outer shell; means communicating with the interior of said inner shell and said jacket space for reducing the air pressure below atmospheric within the inner shell and jacket space; whereby the interiors of said jacket space and inner shell are both subjected to vacuum to provide insulation in said jacket space and to prevent inward collapse of said inner shell; and longitudinally spaced annular reinforcing members in said jacket space surrounding said inner shell and engaging said inner and outer shells to support said inner shell.

3. In vacuum tank apparatus for receiving milk: an outer shell; an inner shell of non-corrosive material within said outer shell and spaced inwardly from said outer shell substantially completely around said inner shell to avoid contact with said outer shell and to provide a jacket space between said inner and outer shells containing air throughout its length; means communicating with the interior of said inner shell and jacket space for reducing the air pressure below atmospheric within the inner shell and jacket space; whereby the interiors of said jacket space and inner shell are both subjected to vacuum to provide insulation in said jacket space and to prevent inward collapse of said inner shell; refrigeration tubing in said jacket space contacting the exterior of said inner shell and extending over a portion of said inner shell and spaced from the interior of said outer shell; and reinforcing means in said jacket space surrounding and supporting said inner shell and refrigeration tubing, said reinforcing means being of a lesser lateral extent in the region of said refrigeration tubing than in regions around the inner shell devoid of refrigeration tubing.

4. In vacuum tank apparatus for receiving milk: an outer shell; an inner shell of non-corrosive material within said outer shell and spaced inwardly from said outer shell substantially completely around said inner shell to avoid contact with said outer shell and to provide a jacket space between said inner and outer shells containing air throughout its length; means communicating with the interior of said inner shell and jacket space for reducing the air pressure below atmospheric within the inner shell and jacket space; whereby the interiors of said jacket space and inner shell are both subjected to vacuum to provide insulation in said jacket space and to prevent inward collapse of said inner shell; refrigeration tubing in said jacket space contacting the exterior of said inner shell and extending over a portion of said inner shell and spaced from the interior of said outer shell; longitudinally spaced annular reinforcing members in said jacket space surrounding and supporting said inner shell and refrigeration tubing, said reinforcing members extending from said refrigeration tubing to said outer shell in the region of said refrigeration tubing and from said inner shell to said outer shell in regions around said inner shell devoid of refrigeration tubing.

5. In vacuum tank apparatus for receiving milk: an outer shell; an inner shell of non-corrosive material within said outer shell and spaced inwardly from said outer shell substantially completely around said inner shell to avoid contact with said outer shell and to provide a jacket space between said inner and outer shells containing air throughout its length; refrigeration tubing in said jacket space contacting the exterior of said inner shell and extending over a portion of said inner shell and spaced from the interior of said outer shell; longitudinally spaced annular reinforcing members in said jacket space surrounding and supporting said inner shell and refrigeration tubing, said reinforcing members extending from said refrigeration tubing to said outer shell in the region of said refrigeration tubing and from said inner shell to said outer shell in regions around said inner shell devoid of refrigeration tubing; a vacuum chamber; a vacuum line communicating with said chamber; and conduit means opening into said chamber and into the interiors of said jacket space and inner shell; whereby the interiors of said jacket space and inner shell are both subjected to vacuum to provide insulation in said jacket space and to prevent inward collapse of said inner shell.

6. In vacuum tank apparatus for receiving milk: an outer shell; an inner shell of non-corrosive material within said outer shell and spaced inwardly from said outer shell substantially completely around said inner shell to avoid contact with said outer shell and to provide a jacket space between said inner and outer shells containing air throughout its length; refrigeration conducting means in said jacket space in contact with the air therein and contacting the exterior of said inner shell to cool milk in said inner shell and spaced from the inner surface of said outer shell; means communicating with the interior of said inner shell and said jacket space for reducing the air pressure below atmospheric within the inner shell and jacket space; whereby the interiors of said jacket space and inner shell are both subjected to vacuum to provide insulation in said jacket space and to prevent inward collapse of said inner shell; and reinforcing means in said jacket space between said refrigeration tubing and said outer shell.

7. In vacuum tank apparatus for receiving milk: an outer shell; an inner shell of non-corrosive material within said outer shell and spaced inwardly from said outer shell substantially completely around said inner shell to avoid contact with said outer shell and to provide a jacket space between said inner and outer shells; a vaccuum chamber; a vacuum line communicating with said chamber; a first pipe extending through said jacket space and opening into the interior of said inner shell and into said chamber; a second pipe surrounding and spaced from said first pipe and opening into the interior of said jacket space and into said chamber; said chamber having a lower portion below the upper end of said second pipe and inclined downwardly toward said vacuum line to direct moisture in said chamber toward said vacuum line.

8. In vacuum tank apparatus for receiving milk: an outer shell; an inner shell of non-corrosive material within said outer shell and spaced inwardly from said outer shell substantially completely around said inner shell to avoid contact with said outer shell and to provide a jacket space between said inner and outer shells containing air throughout its length; refrigeration conducting means in said jacket space in contact with the air therein and contacting the exterior of said inner shell to cool milk in said inner shell and spaced from the inner surface of said outer shell; a vacuum chamber; a vacuum line communicating with said chamber; a first pipe extending through said jacket space and opening into the interior of said inner shell and into said chamber; a second pipe surrounding and spaced from said first pipe and opening into the interior of said jacket space and into said chamber; and deflector means extending from said first pipe and projecting below the upper end of said second pipe and laterally beyond said second pipe, whereby moisture from said first pipe is prevented from entering said second pipe.

References Cited in the file of this patent

UNITED STATES PATENTS

| 339,885 | Hill | Apr. 13, 1886 |
| 962,710 | Levin | June 28, 1910 |
| 1,692,670 | Mesurier | Nov. 20, 1928 |
| 1,787,101 | Bramwell | Dec. 30, 1630 |
| 2,024,639 | Greene | Dec. 17, 1935 |
| 2,389,246 | Davey | Nov. 20, 1945 |
| 2,594,603 | Zamboni | Apr. 29, 1952 |
| 2,668,692 | Hammell | Feb. 9, 1954 |